350-96.27 SR
XR 3,141,106
CROSS REFERENCE SEARCH ROOM
TX 3076N

July 14, 1964 N. S. KAPANY 3,141,106 X 2536

IMAGE TRANSMITTING SCREEN

Filed Dec. 12, 1958

3 Sheets-Sheet 1

INVENTOR.
NARINDER S. KAPANY
BY
Hill, Sherman, Meroni, Gross & Simpson
ATTYS.

3141106
OR IN 313/475

INVENTOR.
NARINDER S. KAPANY
BY
Hill, Sherman, Meroni, Gross & Simpson
ATTYS.

July 14, 1964 N. S. KAPANY 3,141,106

IMAGE TRANSMITTING SCREEN

Filed Dec. 12, 1958

3 Sheets-Sheet 3

INVENTOR.
NARINDER S. KAPANY
BY
Hill, Sherman, Meroni, Gross & Simpson
Att'ys.

3,141,106
Patented July 14, 1964

3,141,106

IMAGE TRANSMITTING SCREEN

Narinder S. Kapany, Chicago, Ill., assignor, by mesne assignments, to American Optical Company, a voluntary association of Massachusetts Filed Dec. 12, 1958, Ser. No. 779,935
26 Claims. (Cl. 313—92)

The present invention relates to a novel means for the transmission of images emitted from a lambertian source or surface, and has particular applicability in the photographic recording of images presented on the screen of a cathode ray tube, or on the electroluminescent layer of a solid state image intensifier, or on like electronic and other devices. As is discussed in greater detail below, by the utilization of various basic concepts derived from the art known as "Fiber Optics" I am able to construct a novel image transmitting device, and particularly, an electroluminescent screen, which offers marked improvement over similarly used screens in the prior art, and provides a manifold increase in light transmission and image contrast over such known screens. Even more particularly, I am likewise able to provide a cathode ray tube and a solid state or electronic image intensifier which have such screens as integral components thereof.

In one example of a conventional method of transporting an image from a phosphorescent screen to a detector, such as a photographic plate or a photocell by the use of a lens system, considerable loss of light is incurred. Not only is there such loss or reduction due to the inherent properties of the lens itself, i.e., absorption phenomena, etc., but in addition, even with a low ratio aperture lens system only a small fraction of the total light is collected from the screen. Combined with such factors detrimental to light transmission is the problem that a phosphor point on a glass plate emits through such glass approximately as a lambertian source and a portion of the forward hemispherical envelope of the emitted light produced upon activation of the phosphor is totally internally reflected at the glass-air interface. This totally reflected light contributes to the halo produced during operation of the phosphorescent screens of the prior art and causes a further loss of resolution and contrast therein.

In the conventional system, if the source is considered to be isotropic, that fraction of the light refracted out of the screen at the glass-air interface is redistributed from the phosphor point source into a $2\pi$ solid angle in air. Since the lens system accepts and transmits only a small portion of such refracted light cone, because of reflection and absorption losses within the lens component itself, it can be shown that only a minute fraction of the phosphor-emitted light reaches the photographic plate. In mathematical terms such latter light fraction, i.e., that impinging upon the photographic plate, is given by the following expression:

$$E_{\text{Film}}=\left\{1-\left[1-\left(\frac{N'}{N}\right)^2\right]^{1/2}\right\}\left\{1-\left[\frac{4F^2}{4F^2+d^2}\right]^{1/2}\right\}\cdot\tau$$

where N, N′ are the refractive indices of the glass plate and the surround respectively, $d$ is the lens diameter, F its distance from the virtual image surface (inside the glass plate) and $\tau$ is the transmission factor of the lens system.

From the foregoing relationship it can be shown that even under the most optimum set of conditions, i.e., $\tau=0.75$, $d=F$ (using two F/1 lenses set back to back), $N=1.5$ and $N'=1$, only 1.8% of the light emitted by the phosphor surface reaches the photographic plate. Even with an anisotropic source, e.g., Lambertian, such transmission would be only slightly modified.

It also has been proposed to transmit an image from a conventional cathode ray tube to a viewing screen by a bundle of transparent fibers. For example, see U.S. Patent No. 2,825,260 issued to B. O'Brien, dated March 4, 1958. In this instance too, there is a loss of light and image resolution and contrast since the light passes through the relatively thick conventional glass plate which forms the front face of the cathode ray tube before entering the fiber bundle, and again, because of internal reflections within such plate, a portion of the light is either totally lost or escapes from the glass at a point other than that directly opposite the phosphor. Such patent in no way indicates or teaches the importance of the refractive index relationship between the fiber and the glass plate, or the thinness of such plate, both of which, as is shown below in one embodiment of my invention, are critical to the success thereof.

In another suggested configuration, one end of a transparent fiber bundle formed of uncoated transparent fibers is embedded in the glass plate of the cathode ray tube screen. Illustrative of this is U.S. Patent No. 2,354,591 to A, N. Goldsmith dated July 25, 1944. Such system picks up and transmits more of the emitted flux than the complete exterior positioning of the fiber bundle as shown in O'Brien, but again internal reflections within the glass before the fiber is reached cause halo and light loss. Again, the criticality regarding the relative refractive indices is not taught.

I have found that the transparent fibers must either directly abut upon the phosphor source, or preferably be separated therefrom by an extremely thin layer of transparent material which has a lower refractive index than the refractive index of the fiber. In addition, it is preferred that the circumferential walls of each fiber be coated with a material of lower refractive index than that of the fiber but of a greater index than that of the intermediate thin layer. By so providing in any of the embodiments herein disclosed, it is possible to transmit practically all of the light emitted in the forward hemispherical envelope by the phosphor point. By the use of a screen formed of an appropriate assembly of parallel side-by-side arrayed light-transparent fibers or rods, as herein taught, approximately 80% to 90% or more of the flux emitted in the forward hemispherical envelope aforementioned is transmitted to the photographic plate and thus screens manufactured in accord herewith offer a multiple exposure gain in addition to the complete elimination of the halo found in presently available similar devices.

In view of the foregoing discussion, a primary object of my invention is to provide an improved light-transmissive screen.

Another object of my invention is to provide an electroluminescent screen composed of a bundle of coated, image-conveying fibers which abut directly onto a phosphor source.

Another object of my invention is to provide an electroluminescent screen composed of a bundle of image conveying fibers which abut onto an emitting surface through an extremely thin intermediate member formed of a material having a lower refractive index than the refractive index of such fibers.

Another object of my invention is to provide a method and related apparatus for the transmission of images from diffusely emitting sources.

A further object of my invention is to provide a novel method and related apparatus for the photographic recording of images emitted from a lambertian source.

A more specific object of my invention is to provide a novel screen for a cathode ray tube.

Another object of my invention is to provide a novel screen for a cathode ray tube which also is an image dissector.

Another more specific object of my invention is to provide a novel image transmission means for an image intensifier.

Other objects, features and advantages of the instant invention will become apparent to those skilled in this particular art from the following detailed disclosure thereof and the accompanying drawings in which:

FIGURE 1 schematically illustrates the theoretical considerations involved in the emission, propagation and photography of lambertian images;

FIGURE 2 discloses in detail one of the many similar units which form one embodiment of the electroluminescent screen of the present invention;

Figure 9:
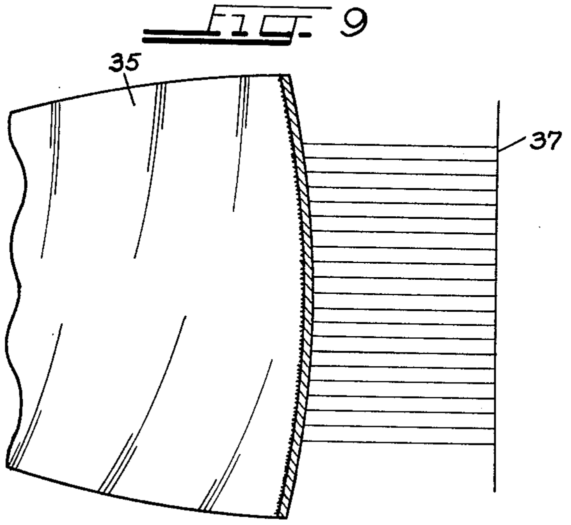
Figure 10:
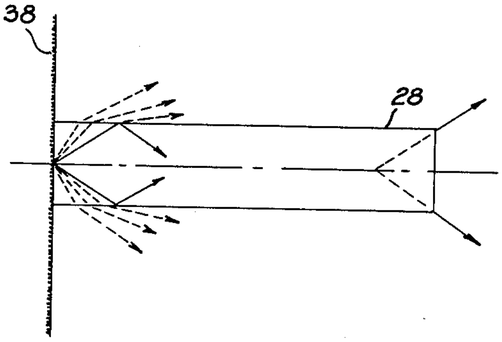
Figure 11:
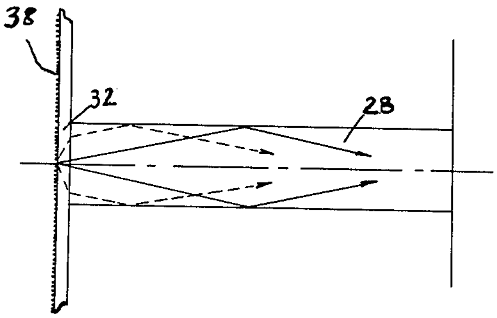
Figure 12:
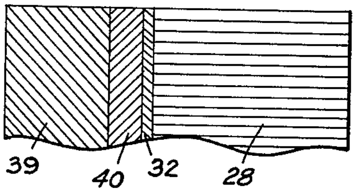
Figure 13:
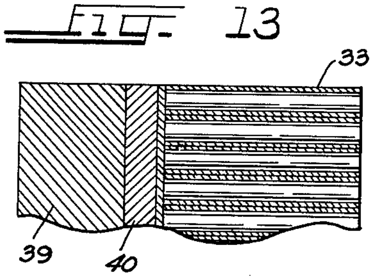
Figure 14:
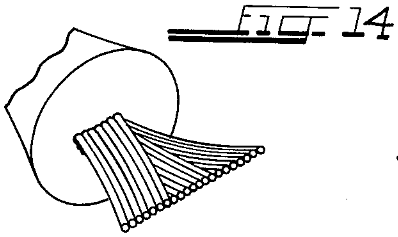
Figure 15:
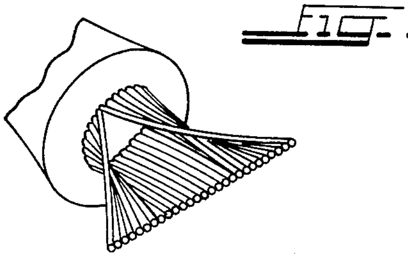

FIGURE 9 schematically discloses the photography of a cathode ray tube image in accordance herewith;

FIGURE 10 discloses another modified screen, but showing only one fiber unit thereon;

FIGURE 11 illustrates a modification of the unit shown in FIGURE 10;

FIGURE 12 diagrammatically discloses a solid state image intensifier incorporating the principles and teachings of the present invention;

FIGURE 13 diagrammatically illustrates a modification of such image intensifier;

FIGURE 14 illustrates a modified cathode ray tube screen which is also an image dissector; and, FIGURE 15 illustrates another modified cathode ray tube which is also an image dissector.

The present invention makes use of the teachings of the relatively novel art known as "Fiber Optics." In such art, optical images are transported from an image receiving plane to an image viewing plane by extremely small diameter, light-transparent fibers, said fibers, while individually useful, being for most purposes formed into a compact bundle. Each of said fibers carries an image point from one end of the bundle to the other end thereof by the optical phenomena of multiple internal reflection. The basic concept of my invention is to employ a screen formed of a bundle of such transparent fibers to convey the image directly from the phosphor surface to the film plate, for as mentioned previously, by the use of an appropriate assembly of such fibers or rods approximately 80% to 90% or more of the flux emitted by the phosphor is transmitted to the photographic plate, and consequently a gain in exposure and complete elimination of halo is now feasible.

Figure 1:
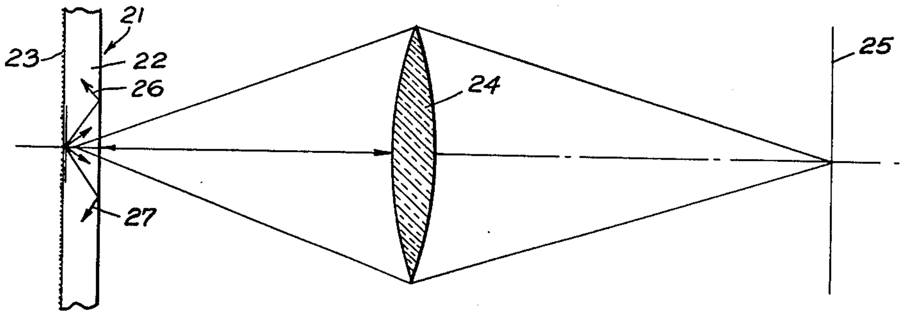

In order that the shortcomings in the prior art may be more clearly understood and to better visualize the improvements made possible by the utilization of the instant invention, at the onset there should be considered the specific problems faced in present day photographic recording of images formed on the screen of a cathode ray tube. It should of course be understood that similar problems are involved in the photographic recording of images formed on the electroluminescent layer of a solid state image intensifier and like devices, but for purposes of discussion, the example using a cathode ray tube is herein discussed in detail. Such problems are seen in conjunction with FIGURE 1 which diagrammatically discloses the primary system for present day photography of cathode ray tube images. In such figure is shown a cathode ray tube screen indicated generally by the numeral 21, which screen is composed of a glass plate 22 having a phosphorescent phosphor layer 23 on the internal face thereof. A lens system 24 and a photographic film plate 25 complete the general system. For purposes of discussion, it should be assumed that such system is to transmit images from the screen to the film plane through air (except, of course, the lens system glass) and that the air has a designated refractive index N′ whereas the cathode ray tube glass has a refractive index designated by N. Upon its energization, as, for example by an electron beam, the phosphor layer 23 emits light as a diffuse source and a portion of the hemispherical envelope of such emitted light is totally reflected at the N, N′ interface. It is such totally reflected light which contributes to halo formation and causes a loss of image resolution and contrast. This totally reflected light is indicated in the diagram of FIGURE 1 by light rays 26 and 27. As discussed above, the fraction of the total light produced by the phosphor refracted out of the screen at the glass-air interface is further redistributed into a $2\pi$ solid angle in air and only a small fraction of such light passes into the lens system 24. Additional light losses result within the lens system itself and, as indicated above, even under the most optimum conditions with an isotropic source only 1.8% of the phosphor-emitted light reaches the photographic plate 25.

Figure 2:
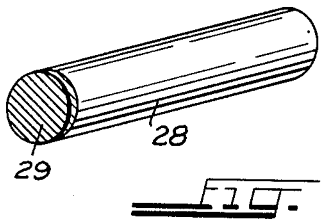
FIGURE 2A is a longitudinal sectional view of the unit shown in FIGURE 2 illustrating the transmission of light therethrough.
FIGURE 2B illustrates a bundle of such fibers.
Figure 2A:
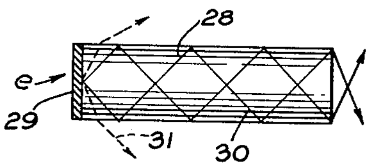
Figure 2B:
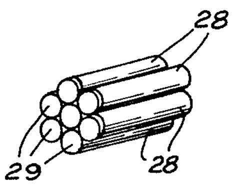

Theoretical considerations of the improvements encompassed within the present invention are seen by reference to FIGURES 2 and 2A. In accordance with these drawings, a simple embodiment hereof is presented for purposes of discussion. A phosphorescent screen is formed of an array of parallel units of small diameter, short-length glass fibers 28 having a phosphor coating 29 upon one end thereof. Intermediate the opposed faces of the fiber 28 and the phosphor 29 is an extremely thin clear cement layer—as thin as possible—which serves to unite such two members. When a multitude of such fiber units are placed side by side to form a three dimensional screen, the phosphor coated ends of each fiber point in the same direction and form the interior face of the instant screen. In a screen formed of this particular fiber unit embodiment, each fiber is uncoated and abuts directly upon its neighboring fibers except for the interspersal of small amounts of cementum. Such grouping of fibers is shown in FIGURE 2B. Upon energization of the phosphor layer to produce light, such light is conducted through the fiber by multiple internal reflection and may be readily photographed at the exit end thereof.

In FIGURE 2A, the solid lines 30 indicate the light emitted by the phosphor which is internally reflected therethrough and exits at the end thereof opposite the phosphor coating to be recordable by a photographic plate. A portion of the emitted light, as illustrated by the broken lines 31, leaks or escapes from said fiber and in many instances diffuses into neighboring fibers to cause a reduction in image contrast. In some instances such light leakage may assume considerable importance. To those skilled in this art, it will be immediately understood that the light rays which strike the internal fiber wall at angles greater than the critical angle will be internally reflected therethrough, whereas the light rays which impinge at an angle less than the critical angle will be refracted out of the fibers. The subsequently disclosed embodiments of the fiber units are provided either to minimize or completely eliminate such light leakage phenomena.

To better understand these other embodiments, a brief introduction to the pertinent optical theory should first be considered. From the theoretical standpoint, it is known that the light emitted from the phosphor which strikes the internal wall of the fiber at an angle less than the critical incidence angle will leak from the fiber whereas all of the other light components will pass down the fiber to impinge upon the photographic plate or some other sensing device located at the exit end thereof. When the fiber is placed directly in contact with the diffuse image source (e.g., a phosphor point) only the fraction of the light cone with a semi-cone angle of $$\frac{\pi}{2}-\alpha_c$$

where $$\alpha_c=\mathrm{Sin}^{-1}\frac{N'}{N}$$

$N'$=the refractive index of the fiber, and
$N$=the refractive index of its surround is conducted along the fiber and the light in the remaining cone escapes through the fiber wall and diffuses into neighboring fibers. Such diffusion of light is obviously undesirable as it causes reduction of image contrast. However, the placement of a thin, low refractive index member at the entrance end of the fiber, i.e., positioned intermediate the phosphor layer and the transparent fiber, permits a reduction of the angular subtense of oblique rays with the fiber axis. This is to say that light diffusion out of a fiber can be markedly reduced by the interpositioning of a transparent material having a lower refractive index than the refractive index of the fiber, and as a consequence even rays that would have been steeply inclined may be so directed to strike the fiber wall at an angle greater than critical incidence. The angular subtense of the rays emitted by the phosphor that are conducted along the fiber is thus given by the formula:

$$U=\mathrm{Sin}^{-1}\frac{N}{N'}\left[1-\left(\frac{N''}{N}\right)^2\right]^{1/2}$$

where N, N' and N'' are the refractive indices of the fiber, the interposed low refractive index layer and the material surrounding the fiber respectively. From the foregoing relationship, it can be shown that in addition to the use of the low refractive index intermediate layer that by the use of a comparatively high refractive index fiber and a comparatively low refractive index coating circumferentially surrounding said fiber, a unit is provided which conducts to a photographic plate most or practically all of the light emitted by the phosphor. As a matter of fact, my experiments to date have shown that a gain of from 200 to 300 times may be achieved by using the instant fibers for transposing the image from a cathode ray tube to a photoreceptor.

Figure 3:
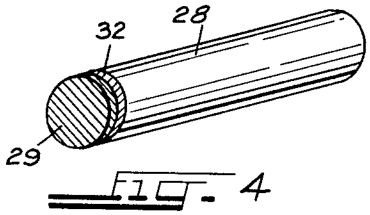
FIGURE 3 illustrates a modification of such unit.
Figure 3A:
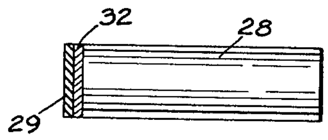
FIGURE 3A is a longitudinal sectional view of the unit shown in FIGURE 3.

In FIGURES 3 and 3A the fiber 28, instead of directly abutting upon the phosphor source 29, is separated therefrom by a thin layer of comparatively low refractive index transparent material 32. As in the previously discussed embodiment, the components are bound together at their respective interfaces by an ultra-thin layer of clear cement. In the construction of this particular fiber unit, the light-entrance end of the fiber is first coated with the lower refractive index layer 32, and upon such layer is then deposited the phosphor layer 29. As discussed above in the preceeding theoretical considerations, such layer 32 reduces the angular subtense of the light rays 31 to markedly reduce the light flux escaping the fiber, and thus the fiber unit shown in FIGURES 3 and 3A provides a greater degree of light transmission than that of the unit shown in FIGURES 2–2B.

Even with the interpositioning of the relatively low refractive index layer between the phosphor and the fiber, there still results a small amount of light diffusion out of and into neighboring fibers. In order to further improve the light transmission characteristics of the fiber unit and to further reduce the diffusion of light therefrom, reference should be had to FIGURES 4 and 4A wherein a circumferentially coated fiber unit is illustrated. Such embodiment has essentially the same basic structure as the unit shown in FIGURES 3 and 3A, namely a circular-sectioned transparent fiber 28, a phosphor layer 29, and the interposed thin layer 32. However, in such embodiment I further provide a thin, transparent coating 33 circumferentially surrounding the entire fiber intermediate the ends thereof. Such coating 33 has a comparatively lower refractive index than the refractive index of the fiber core 28 of the unit. It is feasible, of course, that the intermediate layer 32 and the coating 33 be formed of the same material and in commercial production it is envisioned that such may be the case; however, for the optimum results it is preferred that the layer 32 have a lower refractive index than that of the coating 33. Thus $$\mathrm{Fiber}_{R.I.}>\mathrm{Coating}_{R.I.}>\mathrm{Intermediate\ Layer}_{R.I.}$$

represents the preferred structure of this particular embodiment. By the use of a comparatively high refractive index fiber core in combination with the low refractive index coating and interposed lower refractive index disc, a fiber system is formed which conducts practically all of the light emitted by the phosphor 29. It should be understood that if one is willing to forego a fraction of the benefits hereby made available by the coating-intermediate layer refractive index relationship, this index of the layer may be slightly greater than that of the coating.

The thin, low refractive index coating is preferably directly fused to the fiber core medium which it surrounds or may be cemented thereto with a clear cement.

Figure 4:
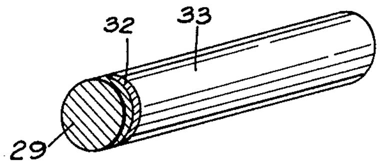
FIGURE 4 illustrates another modification of such unit.
Figure 5:
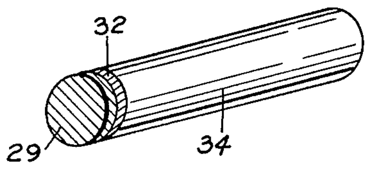
FIGURE 5 illustrates still another modification of such unit.
Figure 5A:
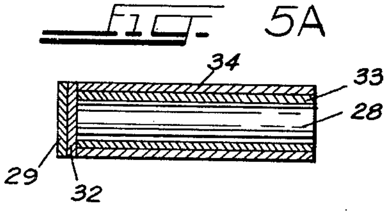
FIGURE 5A is a longitudinal sectional view of the unit shown in FIGURE 5.

Reference should next be had to FIGURES 5 and 5A which illustrate the preferred embodiment, of the individual fiber units which form the screens of the present invention. In such embodiment a thin metallic sheath 34 circumferentially covers the fiber area of the unit shown in FIGURE 4. This fiber unit is characterized by the important feature of substantially eliminating all diffusion from a particular fiber in its neighboring fibers.

Figure 4A:
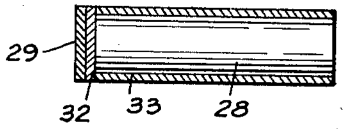
FIGURE 4A is a longitudinal sectional view of the unit shown in FIGURE 4.

In FIGURES 4 through 5A, the phosphor and the intermediate layers 29 and 32 are shown as uncovered by either the transparent layer 33 or the metallic sheath 34. It should be understood that either or both of said external coatings may extend to surround one or both such members 29 and 32 if the manufacturer wishes. This will depend upon how the instant screens are made, the thickness of the surrounding coatings and the degree of surrounding opacity permitted of each fiber unit. These factors are discussed in greater detail below.

Before considering the formation of the aforedescribed fiber units into various phosphorescent screens and additional embodiments of my invention, the aspect hereof which relates to fiber size, materials and various other parameters should be mentioned. As indicated in general terms above, the fibers or rods which form the instant units are preferably substantially circular in cross-section in order to make use of optimum internal reflection phenomena. Since internal corners act as light traps, square or other shape sectioned fibers which possess sharp corners may not be used in the present invention. In addition to this sectional shape requirement, there are certain limitations in the diameter dimensions of such fiber units. In a previous discussion herein, it has been indicated that each individual fiber transmits an image point from one end to the other end of the fiber bundle. The relationship of such point transmission phenomena to fiber diameter is evident: the smaller the diameter of each fiber the greater will be the number of point images transmitted per overall cross sectional bundle area, and thus the smaller the diameter the greater will be the contrast and resolution of the instant devices. It is therefore preferred that fiber diameter be as small as possible, but as a practical limitation such diameter should range from approximately 10 microns up to 1 millimeter, with the preferable size being approximately 25 microns. Such preferable diameter is indicated from a balancing of the image transmission feature against the problems of making thinner fibers. While the bundle formed of 10 micron fibers offers optimum image resolution such fibers require somewhat specialized care in their production whereas the 25 micron fibers may be formed with comparative ease by standard fiber drawing techniques.

The fibers should be formed of light-transparent material which absorbs as little light as possible. Good quality glass or clear plastic or the like may readily be used, but it is preferred that good quality, high refractive index glass be provided as the optimum material from which the instant fibers are fabricated.

The length of the individual fiber depends upon the degree of transmission required and the absorption coefficient of the particular material to be used in combination with the requirement that screens formed of such fibers have adequate strength for their particular function. For the usual, substantially flat-faced cathode ray tube screen, the fibers should be approximately ½ inch long, although for some specific embodiments hereof fibers from ¼ inch up to 6 inches or more in length may also be used. For some specific end items, as for example those embodiments of my invention illustrated in FIGURES 14 and 15, extremely long length fibers are employed.

It should also be mentioned that for some purposes the fibers and fiber units which form the instant screens are of substantially equal length across the area of the entire screen face, whereas for others, as for example in the image dissectors discussed below, the lengths may vary inter sese as determined by the fabricator thereof. Along similar lines, in many instances it is preferable to energize a curved phosphor surface (as illustrated in FIGURE 9) instead of a flat surface. Then, assuming that the exit ends of the fibers are to be directed onto a flat photographic plate and that the best results are obtained by having all such exit ends lying in the same plane, it follows that the fibers from such curved phosphor will not be of equal length.

The intermediate low refractive index material 32 positioned between the fiber and the phosphor should likewise preferably be circular in section, again depending upon the mode of manufacture of the screen, and as thin as possible. For example, I have found that when this disc is between one and two microns in total thickness that extremely good results are obtained. Such disc, or layer in some instances, is formed of clear glass, plastic, or other transparent material, provided of course that it has a lower refractive index than the refractive index of the material forming the fiber. In the preferred embodiments hereof, such intermediate material also has a lower refractive index than that of the transparent coating around the fiber.

The low refractive index coating should also be as thin as possible, in the order of 0.5 to 1.0 micron preferably. The thickness of such coating is somewhat dependent upon the diameter of the fiber core in that it is detrimental to the successful operation of the instant screens if such coating material form considerable light-opaque or light-diffusion areas. This is essentially a problem of the comparable areas of the fiber core and such coating, as is illustrated in the following table:

*Table I*

| Fiber Diameter, μ | Coating Thickness, μ | Coating Area/ Fiber Area |
|---|---|---|
| 10 | 1 | .21 |
| 20 | 1 | .10 |
| 25 | 1 | .08 |
| 100 | 1 | .02 |
| 25 | 2 | .16 |
| 50 | 2 | .08 |
| 25 | 5 | .21 |
| 50 | 5 | .44 |
| 100 | 5 | .11 |

The metallic coating, when used, should likewise be as thin as possible since it provides a darkened effect upon the overall image pattern, and in most instances should range in thickness from 300 to 1,000 Angstrom units. Such coating is preferably selected from the group of metals which readily assume a high polish and luster such as aluminum, silver and indium, although other metals may be used.

In lieu of the metallic coating, coatings formed of other opaque materials may be utilized herewith.

The phosphors which are useful herewith may be selected from a multitude of such materials at present commercially available, their specific compositions not forming a part of the present invention, and may be either opaque or transparent to visible light.

The fibers coated with a transparent material of lower refractive index may be most readily formed in accordance with the process disclosed in my co-pending patent application entitled "Method of Improving the Transmission of Dielectric Fibers," U.S. Serial No. 750,811, filed July 24, 1958, which application is likewise assigned to the assignee of the present application and has been abandoned. In such referenced applications there is disclosed a method whereby coated fibers are produced by the co-drawing of a glass rod encased within a glass tube, both being thermally softened, wherein said rod has a higher refractive index than that of its encasing tube. The coated fiber filaments produced by such process are then cut to the particular size required for particular use in the instant screens.

The metallic coating is deposited by any of a multitude of known techniques, as for example by passing the glass-coated glass fiber through a pool of molten metal, vapor deposition, etc.

Following the formation of the particular fiber units being employed, by the application of small amounts of clear cementum therebetween such units are formed into a three-dimensional screen mass.

The manner in which the fibers are aligned and maintained in comparable relative position particularly at both ends of the screen will depend somewhat on the use of the screen and the length of the fibers. For example, in a cathode ray tube, the screen forms one wall of a vacuum system and thus must be completely air tight in addition to being comparatively strong to withstand the air pressures on the outer face thereof. In the instance wherein the phosphor point sources are applied directly to the ends of the fiber units, a cementum may be applied between each individual fiber to not only provide adherence but also to make the entire screen air tight and further to maintain the similar positioning relationship of the fibers within the bundle from one end to the other end, or the fibers may be fused together via their coatings by means of heat. Where a cementum is required, a material, as for example, methyl methacrylate, indium, lead and other low melting point-glass-wetting metal and various epoxy resins, may preferably be used. For other purposes where the fibers are comparatively long and the strength requirements are not clearly so demanding it is only necessary to cause inter-fiber adherence at both ends of the fiber mass.

Figure 6:
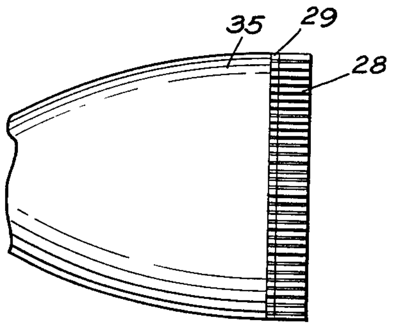
FIGURE 6 is a side view in section of one modification of a cathode ray tube screen made in accord herewith.
Figure 6A:
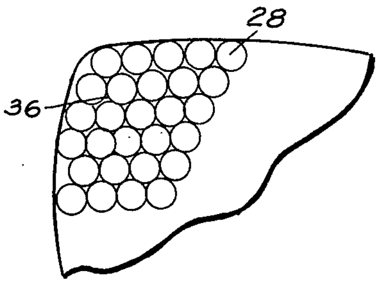
FIGURE 6A is a fragmentary front end view, greatly magnified, of the screen shown in FIGURE 6.
Figure 7:
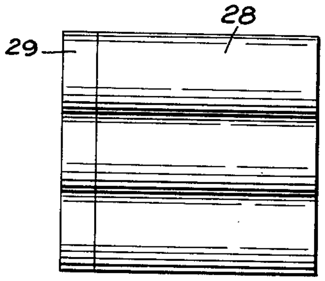
FIGURE 7 is a magnified view of a portion of the cathode ray tube screen shown in section in FIGURE 6.
Figure 8:
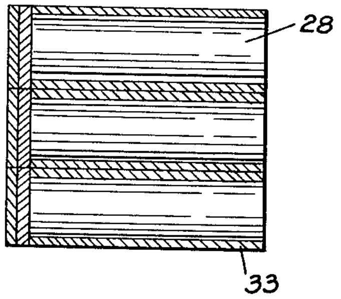
FIGURE 8 is a fragmentary sectional view, greatly magnified, of a modification of the instant cathode ray tube screen.

The structure of a cathode ray tube screen produced in accordance with my invention should next be considered by reference to FIGURES 6 through 8. To the front face of usual cathode ray tube, indicated generally by the numeral 35, having well known electronic components, is applied the instant screen as shown in side section in FIGURE 6. Such screen is composed of parallel aligned fiber units, with their phosphor ends facing into the cathode ray tube. The front face of such tube under high magnification presents the appearance shown in FIGURE 6A. Positioned intermediate the fiber units are shown small amounts of cementum 36. FIGURES 7 and 8 are magnified views of two different embodiments showing a composite of the units shown in FIGURES 2 and 4 respectively. In FIGURE 7, the screen is formed merely of a multitude of uncoated transparent fibers 28 having the phosphor coating 29 whereas in FIGURE 8 the same fiber components shown in FIGURE 4 are utilized.

FIGURE 9 schematically discloses the photographic recording of cathode ray tube images by means of the present invention. For purposes of example, a photographic plate 37 is added to the components shown in FIGURE 6. Upon activation of each phosphor point, light is internally reflected through each individual fiber to impinge upon the photographic plate.

FIGURES 10 and 11 disclose another modification of the instant cathode ray tube wherein instead of each fiber having an integral phosphor coated end, the transparent fibers are deposited onto a phosphor sheet or plate 38. In the embodiment shown in FIGURE 10, the transparent fiber units, one of which is indicated by the numeral 28, abuts directly upon such phosphor layer 38 and upon the activation of such layer, light is transported through the fiber. Although an uncoated fiber is illustrated it should of course be understood that coated fiber units may be likewise employed.

In FIGURE 11, a phosphor plate 38 is also used but interspersed between such plate 38 and the fiber 28 is a thin layer of lower refractive index transparent material comparable to the disc 32 discussed previously. The positioning of the intermediate lower refractive index material assists in preventing light diffusion out of the fiber in much the same manner as the disc 32 in FIGURE 3 and is deemed equivalent thereto.

In the embodiments disclosed in FIGURES 10 and 11, when a fiber coated with a lower refractive index material is used, it is possible for the light emitted by the phosphor to be transmitted by such coating. On the other hand, when each individual fiber unit is end-wise provided with a circular disc of phosphor material which is of substantially the same diameter as the fiber core, it is conceivable that the only light carried by the lower refractive index coating results from diffusion out of or into the fiber.

When the screen embodiments illustrated in FIGURES 10 and 11 are made there is somewhat less of a problem in maintaining the vacuum tight structure necessary in the fabrication and operation of a cathode ray tube since the phosphor layer 38 can be made air-tight. In the preferable manner of fabricating this particular embodiment, a fiber bundle is first formed of one of the embodiments shown in FIGURES 2 through 5, lacking of course the phosphor coated end. Upon one end of such bundle is then deposited, most preferably, a layer of lower refractive index transparent materials which has adhesive properties. Over such layer is then laid the phosphor layer 38.

FIGURES 12 and 13 disclose two similar modifications of a solid state image intensifier made in accordance with the teachings of the present invention. Such intensifiers are provided with a photoconductor member 39, an electroluminescent phosphor layer 40 which is positioned adjacent the former layer, such two layers being substantially the same as similar components found in presently available image intensifiers. However, on the face of the electroluminescent layer opposite that of the photoconductive layer is then positioned a bundle of fibers, said fibers being substantially of the same construction as those used in the cathode ray tube screen. Intermediate the phosphor layer 40 and the fiber bundle 28 is positioned a thin layer 32 of lower refractive index material which is electrically conductive and in other respects is substantially equivalent to the layer 32 used in the screen. In FIGURE 12, uncoated fibers are shown; whereas in FIGURE 13, the fibers 28 are provided with a coating of lower refractive index material 33. Such coating of lower refractive index acts to reduce diffusion into and out of neighboring fibers to further enhance image contrast in the same manner that such is provided in the cathode ray tube screen. It is likewise possible to add the thin metallic coating surrounding such fibers as disclosed in the cathode ray tube screen discussed previously.

In addition to the embodiments shown in FIGURES 12 and 13 wherein a distinct electroluminescent layer of phosphor 40 is used, it is also possible to form such phosphor as a coating at the interior end (i.e., photoconducting facing end) of the fiber bundle as shown in FIGURES 2 through 5 of the fiber units, and it will be understood that such structure is considered equivalent to those disclosed in FIGURES 12 and 13. In such instance a transparent, electrically conductive element is interposed between the phosphor and the fiber.

In their operation, the various embodiments of the image intensifier herein disclosed operate quite similarly to the usual image intensifier except for the provision for greater image contrast. That is, as the photoconductive layer activates the phosphor 40, the emitted light is transmitted along the fibers to be sensed in some usual manner, as for example by a photographic film plate. By the use of such fibers halo and lambertian image losses are substantially eliminated.

It should be understood that such image intensifiers may be cascaded.

FIGURE 14 discloses a modified cathode ray tube screen formed of the instant fiber bundles which also acts as an image dissector. As shown in such drawing, instead of the fibers merely running parallel and being of substantially equal length and ending at substantially the same bundle plane as shown in FIGURE 6, in FIGURE 14 the lines of fiber units are drawn out to form an image dissector of approximately 1 fiber line thickness. It is, of course, understood that several tiers of fibers could be so used. This particular type of cathode ray tube screen can likewise be used for the photographic recording of images, with the additional provision that by this embodiment such image is dissected over a comparatively longer length to permit slower photographic recording. In the use of the embodiment shown in FIGURE 6, the photography must be rapid as compared with FIGURE 14 in which it is merely necessary to photograph along the length of a complete fiber line to pick up a complete dissected picture.

In FIGURE 15, another embodiment of an image dissector—cathode ray tube screen is shown wherein instead of tiers of fibers such fibers are formed into a circular shape and again formed into an image dissector line.

In addition to their utilization with visible light, the present screens may likewise be employed with ultra-violet and infra-red radiations, and in the herein appended claims by the term "light" is meant all three. It should also be understood that in some instances two or all three of such radiations may be transmitted simultaneously. For ultraviolet transmission, the fibers may be formed of materials selected from quartz, sapphire and various other ultra-violet transmitters, whereas for infra-red, fibers of quartz, sapphire, arsenic trisulfide, silver chloride and others may be used. In all instances, the aforeconsidered refractive index requirement should be maintained.

It should be understood that modifications and variations may be effected without departing from the spirit or scope of the novel concepts of my invention.

I claim as my invention:

1. A screen comprising phosphor means which emits light upon activation thereof, a thin, transparent member abutting upon one face of said phosphor means, and light-conveying fiber members abutting endwise upon said transparent member, said transparent member being characterized by a lower index of refraction than such index of said fiber members.

2. A screen comprising phosphor means which emits light upon activation thereof, a thin, transparent member abutting upon one face of said phosphor means, and light-conveying fiber members abutting endwise upon said transparent member, said fiber members being circumferentially coated with a material of lower refractive index than such index of said fiber members, said transparent member being also characterized by a lower index of refraction than such index of said fiber members.

3. A screen comprising phosphor means which emits light upon activation thereof, a thin, transparent member abutting upon one face of said phosphor means, and light-conveying fiber members abutting endwise upon said transparent member, said fiber members being circumferentially coated with a material of lower refractive index than such index of said fiber members, said transparent member being characterized by a lower index of refraction than such index of said circumferential coating material.

4. A screen comprising phosphor means which emits light upon activation thereof, a thin, transparent member abutting upon one face of said phosphor means, and light-conveying fiber members abutting endwise upon said transparent member, said fiber members being first circumferentially coated with a material of lower refractive index than such index of said fiber members, which coated fiber is secondly circumferentially coated with a metal, said transparent member being characterized by a lower index of refraction than such index of said fiber members.

5. A screen comprising phosphor means which emits light upon activation thereof, a thin, transparent member abutting upon one face of said phosphor means, and light-conveying fiber members abutting endwise upon said transparent member, said fiber members being first circumferentially coated with a material of lower refractive index than such index of said fiber members, which coated fiber is secondly circumferentially coated with an opaque material, said transparent member being characterized by a lower index of refraction than such index of said fiber members.

6. A cathode ray tube screen comprising in combination: a phosphor layer which emits light upon activation thereof, and means comprising a multitude of parallel side-by-side arrayed light transparent fiber units abutting endwise upon said phosphor layer, each of said fiber units comprising a light transparent fiber core which is circumferentially surrounded by a first thin coating characterized by a lower index of refraction than said fiber core, said coated core being further circumferentially coated by a thin metallic coating, each of said fiber units conveying a light from one end to the other end thereof by the mechanism of internal reflection.

7. A cathode ray tube screen comprising in combination: a phosphor layer which emits light upon activation thereof, and means comprising a multitude of parallel side-by-side arrayed light transparent fiber units abutting endwise upon said phosphor layer, each of said fiber units comprising a light transparent fiber core which is circumferentially surrounded by a first thin coating characterized by a lower index of refraction than said fiber core, said coated core being further circumferentially coated by a thin opaque coating, each of said fiber units conveying light from one end to the other end thereof by the mechanism of internal reflection.

8. A cathode ray tube screen comprising in combination: a phosphor layer which emits light upon activation thereof; a thin transparent layer directly abutting upon one face of said phosphor layer, and means for transmitting light emitted by such phosphor layer abutting endwise upon said transparent layer, such means comprising a multitude of parallel, side-by-side arrayed light transparent fiber units, each of said fiber units comprising a light transparent fiber core characterized by a higher index of refraction than said transparent layer, said fiber core being circumferentially surrounded by a coating characterized by a lower index of refraction than that of said fiber core.

9. A cathode ray tube screen comprising in combination: a phosphor layer which emits light upon activation thereof; a thin transparent layer directly abutting upon one face of said phosphor layer, and means for transmitting light emitted by such phosphor layer abutting endwise upon said transparent layer, such means comprising a multitude of parallel, side-by-side arrayed light transparent fiber units, each of said fiber units comprising of a light transparent fiber core characterized by a higher index of refraction than said transparent layer, said fiber core being circumferentially surrounded by a first thin coating characterized by a lower index of refraction than that of said fiber core said coated core being further circumferentially coated by a thin metallic coating.

10. A cathode ray tube screen comprising in combination: a phosphor layer which emits light upon activation thereof; a thin transparent layer directly abutting upon one face of said phosphor layer, and means for transmitting light emitted by such phosphor layer abutting endwise upon said transparent layer, such means comprising a multitude of parallel, side-by-side arrayed light transparent fiber units, each of said fiber units comprising a light transparent fiber core characterized by a higher index of refraction than said transparent layer, said fiber core being circumferentially surrounded by a first thin coating characterized by a lower index of refraction than that of said fiber core said coated core being further circumferentially coated by a thin opaque coating.

11. A cathode ray tube screen comprising in combination: a multitude of parallel, side-by-side arrayed fiber units, each of said units including a light-conveying fiber, a thin, transparent member of lower refractive index than said fiber abutting one terminal face of said fiber and a phosphor abutting the opposed face of said thin, transparent member, all of said fiber units being similarly oriented.

12. A cathode ray tube screen comprising in combination: a multitude of parallel, side-by-side arrayed fiber units, each of said units including a light-conveying fiber, a thin, transparent member of lower refractive index than that of said fiber abutting upon one terminal face of said fiber, a phosphor abutting the opposed face of said thin, transparent member, and a thin coating of material characterized by a lower index of refraction than that of said fiber circumferentially surrounding said fiber unit, all of said fiber units being similarly oriented.

13. A cathode ray tube screen comprising in combination: a multitude of parallel, side-by-side arrayed fiber units, each of said units including a light-conveying fiber, a thin, transparent member of lower refractive index than said fiber abutting upon one terminal face of said fiber, a phosphor abutting the opposed face of said thin, transparent member, a thin coating of material characterized by a lower index of refraction than that of said fiber circumferentially surrounding said unit, and a thin metallic coating circumferentially surrounding such aforesaid coating, all of said fiber units being similarly oriented.

14. A cathode ray tube screen comprising in combination: a multitude of parallel, side-by-side arrayed fiber units, each of said units including a light-conveying fiber, a thin, transparent member of lower refractive index than said fiber abutting upon one terminal face of said fiber, a phosphor abutting the opposed face of said thin, transparent member, a thin boating of material characterized by a lower index of refraction than that of said fiber circumferentially surrounding said unit, and a thin opaque coating circumferentially surrounding such aforesaid coating, all of said fiber units being similarly oriented.

15. A cathode ray tube screen image dissector comprising phosphor means which emits light upon activation thereof and fiber members abutting at one end thereof upon said phosphor means to transmit light therefrom, each fiber member comprising a light-conveying circular core circumferentially coated with a material of lower refractive index than that of the core of said fiber member, said fiber members being of progressively variable lengths and forming an image plane at their ends opposite those abutting upon said phosphor means, said image plane being greater in one dimension and less in its other dimension than the abutting area of the fiber members upon said phosphor means.

16. A cathode ray tube screen image dissector comprising phosphor means which emits light upon activation thereof and fiber members abutting at one end thereof upon said phosphor means to transmit light therefrom, each fiber member comprising a light-conveying circular core circumferentially coated with a material of lower refractive index than that of the core of said fiber member, and a second circumferential coating of metallic material said fiber members being of progressively variable lengths and forming an image plane at their ends opposite those abutting upon said phosphor means said image plane being greater in one dimension and less in its other dimension than the abutting area of the fiber members upon said phosphor means.

17. A cathode ray tube screen image dissector comprising phosphor means which emits light upon activation thereof and fiber members abutting at one end thereof upon said phosphor means to transmit light therefrom, each fiber member comprising a light-conveying circular core circumferentially coated with a material of lower refractive index than that of the core of said fiber member, and a second circumferential coating of opaque material said fiber members being of progressively variable lengths and forming an image plane at their ends opposite those abutting upon said phosphor means, said image plane being greater in one dimension and less in its other dimension than the abutting area of the fiber members upon said phosphor means.

18. A cathode ray tube screen image dissector comprising phosphor means which emits light upon activation thereof, fiber members to transmit light from said phosphor means and an intermediate thin layer positioned between said phosphor means and said fiber members, said intermediate layer being of lower refractive index than that of said fiber members, said fiber members being of progressively variable lengths and forming an image plane at their ends opposite those abutting upon said phosphor means, said image plane being greater in one dimension and less in its other dimension than the abutting area of the fiber members upon said phosphor means.

19. A cathode ray tube screen image dissector comprising phosphor means which emits light upon activation thereof, fiber members to transmit light from said phosphor means and an intermediate thin layer positioned between said phosphor means and said fiber members, said intermediate layer being of lower refractive index than said fiber members, each fiber member comprising a light-conveying circular core circumferentially coated with a material of lower refractive index than that of said core, said fiber members being of progressively variable lengths and forming an image plane at their ends opposite those abutting upon said phosphor means, said image plane being greater in one dimension and less in its other dimension than the abutting area of the fiber members upon said phosphor means.

20. A cathode ray tube screen image dissector comprising phosphor means which emits light upon activation thereof, fiber members to transmit light from said phosphor means and an intermediate thin layer positioned between said phosphor means and said fiber members, said intermediate layer being of lower refractive index than said fiber members, each fiber member comprising a light-conveying circular core circumferentially coated with a material of lower refractive index than that of said core, but of a higher such index than that of said intermediate layer, and a second circumferential coating of metallic material, said fiber members being of progressively variable lengths and forming an image plane at their ends opposite those abutting upon said phosphor means, said image plane being greater in one dimension and less in its other dimension than the abutting area of the fiber members upon said phosphor means.

21. A cathode ray tube screen image dissector comprising in combination: a multitude of circular fiber units of progressively variable lengths, each fiber unit including a light-conveying fiber one end of which is phosphor-coated, and which fiber is circumferentially coated with a material of lower refractive index, the phosphor-coated ends of all such fiber units facing in the same direction and lying in substantially the same spatial plane, the opposed ends of all such fiber units likewise lying in substantially the spatial plane, said opposed end plane being of a different overall dimension than said phosphor-coated end plane.

22. A cathode ray tube screen image dissector comprising in combination: a multitude of circular fiber units of progressively variable lengths, each fiber unit including a light-conveying fiber, one end of which is phosphor-coated, which fiber is immediately circumferentially coated with a material of lower refractive index, and which is further circumferentially coated by a metallic coating, the phosphor-coated ends of all such fiber units facing in the same direction and lying in substantially the same spatial plane, the opposed ends of all such fiber units likewise lying in substantially the spatial plane, said opposed end plane being of a different overall dimension than said phosphor-coated end plane.

23. A cathode ray tube screen image dissector comprising in combination: a multitude of circular fiber units of progressively variable lengths, each fiber unit including a light-conveying fiber, one end of which is phosphor-coated, which fiber is immediately circumferentially coated with a material of lower refractive index, and which is further circumferentially coated by an opaque coating, the phosphor-coated ends of all such fiber units facing in the same direction and lying in substantially the same spatial plane, the opposed ends of all such fiber units likewise lying in substantially the spatial plane, said opposed end plane being of a different overall dimension than said phosphor-coated end plane.

24. In an image intensifier which emits light from a phosphor source, the improvement comprising a thin, electrically conductive transparent member abutting upon one face of said phosphor source, and light-conveying fiber members abutting endwise upon said transparent member, said transparent member being characterized by a lower index of refraction than such index of said fiber members.

25. In an image intensifier which emits light from a phosphor source, the improvement comprising a thin, electrically conductive transparent member abutting upon one face of said phosphor source, and light-conveying fiber members abutting endwise upon said transparent member, said transparent member being characterized by a lower index of refraction than such index of said fiber members, said fiber members being circumferentially coated by a material of lower refractive index than that of such index of said fiber members.

26. In an image intensifier which emits light from a phosphor source, the improvement comprising a thin, electrically conductive transparent member abutting upon one face of said phosphor source, and light-conveying fiber members abutting endwise upon said transparent member, said transparent member being characterized by a lower index of refraction than such index of said fiber members, said fiber members being circumferentially coated by a material of lower refractive index than that of such index of said fiber members and a circumferential metallic coating.

References Cited in the file of this patent

UNITED STATES PATENTS

| | | |
|---|---|---|
| 1,642,187 | Young | Sept. 13, 1927 |
| 1,751,584 | Hansell | Mar. 25, 1930 |
| 1,848,814 | Allen | Mar. 8, 1932 |
| 2,091,152 | Malpica | Aug. 24, 1937 |
| 2,091,862 | Kessler | Aug. 31, 1937 |
| 2,122,750 | Nicolson | July 5, 1938 |
| 2,128,246 | Hardesty | Aug. 30, 1938 |
| 2,142,609 | Kessler | Jan. 3, 1939 |
| 2,254,057 | Arni | Aug. 26, 1941 |
| 2,354,591 | Goldsmith | July 25, 1944 |
| 2,510,106 | Henroteau | June 6, 1950 |
| 2,706,262 | Barnes | Apr. 12, 1955 |
| 2,757,302 | Hughes | July 31, 1956 |
| 2,825,260 | O'Brien | Mar. 4, 1958 |
| 2,850,657 | McNaney | Sept. 2, 1958 |
| 2,877,368 | Sheldon | Mar. 10, 1959 |